May 30, 1967    J. C. LARSON    3,322,375
CONTROL APPARATUS
Filed Sept. 21, 1964
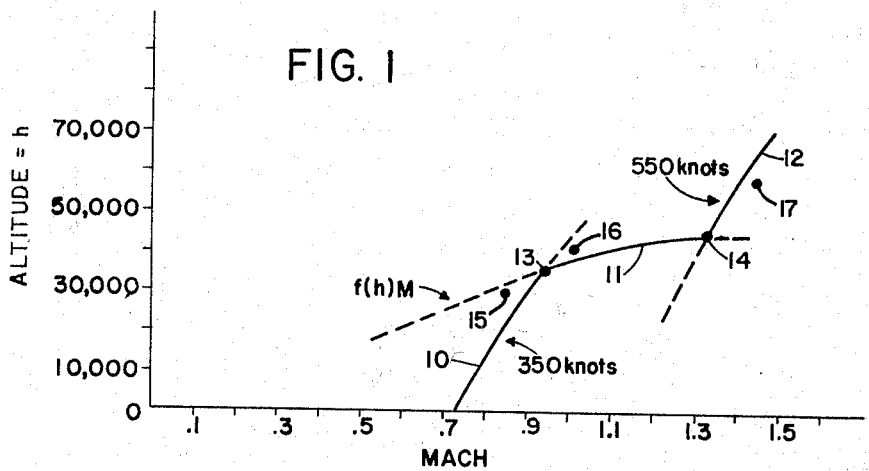
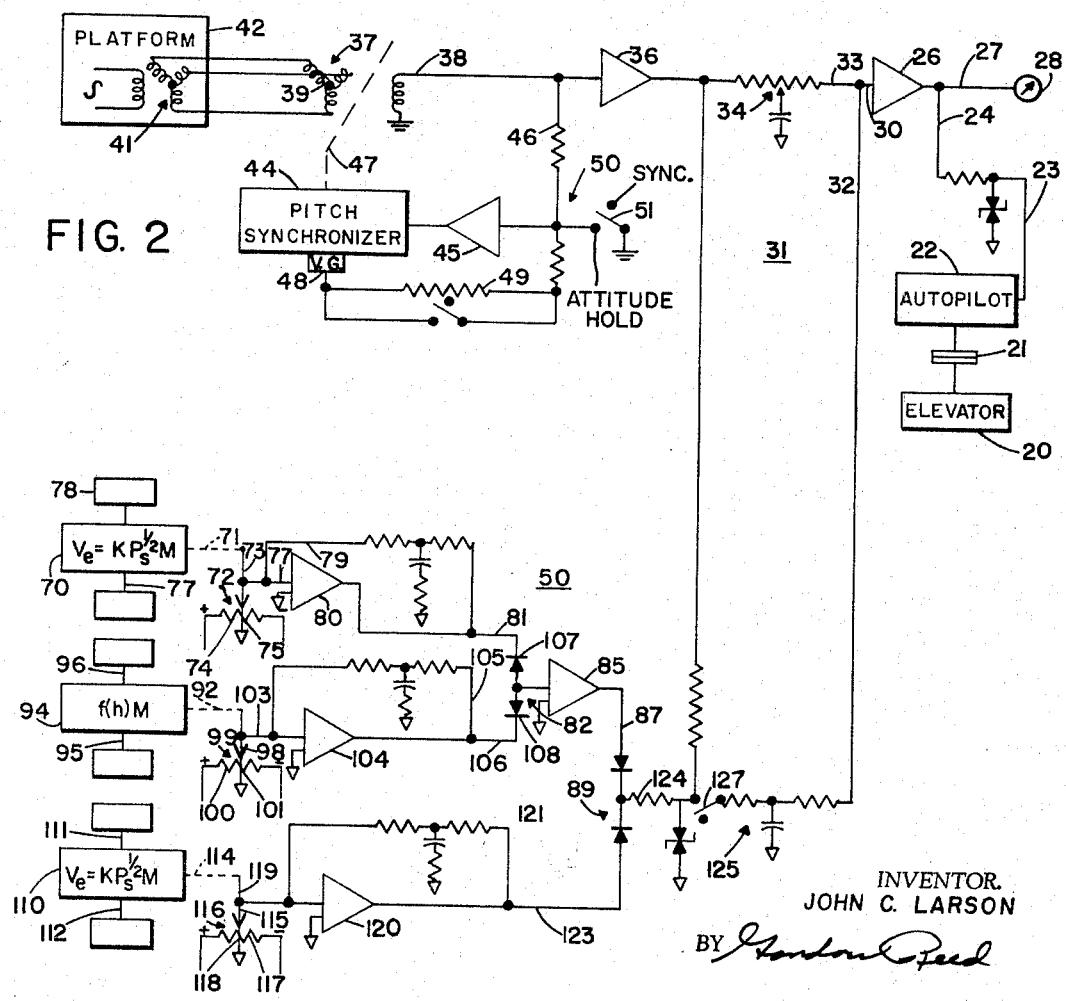
INVENTOR.
JOHN C. LARSON
BY Gordon Reed
ATTORNEY 
United States Patent Office 3,322,375
Patented May 30, 1967

3,322,375
CONTROL APPARATUS
John C. Larson, Minneapolis, Minn., assignor to Honeywell Inc., Minneapolis, Minn., a corporation of Delaware
Filed Sept. 21, 1964, Ser. No. 397,960
12 Claims. (Cl. 244—77)

This invention relates to control apparatus such an automatic pilots for aircraft and the objects of the invention more particularly concern a novel apparatus for controlling the rotational movements of the aircraft about its lateral or pitch axis during a climb or descent maneuver to avoid unwanted ground-pressures. By the present invention, a pitch axis control apparatus is provided that is especially well suited for a type of aircraft having wide ranges of air speed in terms of Mach numbers that includes subsonic, transonic, and supersonic ranges.

The above and other objects and features of the invention will appear more fully hereinafter from a consideration of the following description taken in connection with the accompanying drawings wherein an embodiment of the invention is illustrated by way of example.

Referring to the drawings wherein like reference characters designate like parts:

FIGURE 1 is a flight profile for an aircraft having a wide range of air speed and altitude;

FIGURE 2 is an electrical schematic of automatic control for a programmed climb or descent flight profile for such aircraft.

The flight profile of such craft during a programmed climb may be delineated by three separate curves, all based on a relationship of Mach and altitude, which intersect so that the aircraft follows a portion of the first curve until the point of the first intersection in region of Mach 1 is attained, follows the second curve beyond the point of intersection until maximum Q of the craft is attained which is at the point of intersection of the second and third curves and beyond this second intersection follows the third curve. Thus the novel flight control apparatus is supplied with inputs used for maintaining a constant equivalent air speed for an aircraft of say 350 knots at low altitudes and 550 knots, for example, at higher altitudes. The expression for equivalent air speed is $$V_e = 120.79 P_s^{1/2} M \text{ or } K P_s^{1/2} M$$

where $P_s$=static pressure, $M$=Mach. At a portion of the flight profile intermediate the two above equivalent air speeds of 350 and 550 knots transonic acceleration through suitable control signals is applied to the craft. Thus in the transition range of the flight profile between the 350 knot and 550 knot equivalent air speed control, in the mid-range altitude for the craft, apparatus is provided to optimize the full range of the transonic acceleration.

In this transition range a control signal for the apparatus is derived with a control signal being used on an equivalent air speed a function of $h$ and $M$, written $f(hM)$ where $M$ is the Mach number of the aircraft in flight, $h$ the altitude.

When an aircraft flies at a supersonic speed, shock waves are generated which extend from the aircraft and impinge on the ground. A pressure disturbance is evident on the ground giving rise to the so called "sonic boom." The pressure disturbances may be measured with proper high response pressure transducer. The pressure transient is proportional to the sound intensity associated with shock wave passage.

To keep sound intensity within tolerable limits acceptable to general population, a limit has been prescribed in terms of allowable overpressure at the ground such as 1.5 lb./ft.² For an aircraft flying at a given Mach number, the pressure disturbance diminishes with increasing altitude. Therefore a Mach number, altitude correspondence may be determined which defines combinations of these two variables which will result in the limit pressure disturbance on the ground.

It is desirable to fly along this profile rather than at higher altitudes in order to realize the most economical operation of the aircraft. Thus this quantity is referred to hereinafter as a function of altitude and Mach.

Referring to FIGURE 1, a coordinate plot is shown in which the abscissa of the plot is divided into Mach numbers and the ordinate in altitude. In this plot there are provided two pairs 10, 11 and 11, 12 of intersecting curves with one curve common to the two pairs. The respective curves, as evident, intersect at acute angles. Curve number 10 at ordinate point zero intersects the abscissa axis near .7 Mach. Curve number 10 is referred to as a 350 estimated air speed curve defined as $V_e = K P_s^{1/2} M$ and progresses upwardly and toward the right with increases in Mach and altitude.

Curve 10 intersects the second curve 11 at an acute angle. This curve number 11 intersects the curve 10 in the area of about .94 Mach number for example. Beyond this intersection, the curve 11 progresses upwardly and toward the right with increases in altitude and Mach. Curve 11 is a function of altitude and Mach expressed as $f(hM)$ which factors are so related that an aircraft following this characterized curve 11 will utilize the fuel for the aircraft engines at optimum efficiency and will also by increasing altitude with increases in Mach number of the craft cause less unwanted shock waves on the terrain or prevent excessive sonic boom over pressures on the ground.

The second curve 11 intersects curve 12 in the region of Mach 1.32 for example, which for the particular craft may be maximum $q_c$ that the structure of the craft may withstand safely. Beyond this intersection the curve 12 for 550 knots extends upwardly and toward the right with increases in Mach and altitude.

The three curves delineate a climb or descent flight profile for a particular aircraft. Reviewing, the aircraft follows the 350 knot estimated air speed curve to the intersection point 13 and from there follows the curve 11 which is a function of Mach and altitude to the intersecting point 14 and from there follows curve 12 which may be a higher equivalent air speed.

Beyond intersection point 14 which is the point of maximum $q_c$ for the aircraft, the craft flight profile follows curve 12 which is the 550 knot equivalent air speed. FIGURE 1 therefore represents a programmed climb out flight profile for an aircraft. In the position of the flight before reaching intersection point 13, the throttles of the aircraft engines are set in the number 1 position or termed non-after burning or lower thrust position, but beyond intersecting point 13 the throttles are in the number 2 position or termed after-burning or higher thrust position. While the throttles are in the number 2 position when following curve 11 beyond point 13, the curve is characterized as stated to prevent excessive sonic boom over pressures on the ground.

Reference is made to FIGURE 2 for an electrical schematic of the apparatus for operating a flight control surface of an aircraft. In FIGURE 2, a control surface such as an elevator 20 of an aircraft is operated through a clutch 21 by suitable power means such as a servomotor contained in autopilot 22. The direction of operation of elevator 20 is controlled by the polarity or sense of a signal supplied to autopilot 22 over conductor 23 and a conductor from an amplifier 26. In addition to supplying the control signal to autopilot 22 the amplifier 26 also supplied its output through conductor 27 to a flight indicator 28.

Amplifier 26 is supplied with suitable input terminals one of which is connected through conductor 30 to a D.C. signal summing network 31, which in the present instance is shown as a parallel summing network. The summing network 31 has a summing conductor 32 which receives control signals from various branches. One branch supplies a craft pitch attitude signal and comprises a conductor 33, lag network 34 connected to a demodulator amplifier 36 which receives an input thereto from a synchro-pickup 37 which takes the form of a control transformer having energized winding 38 and a winding 39 connected to a similar winding in a synchro-pickup 41 which may be a transmitter. The synchro 41 includes a winding energized from a suitable A.C. source. Thus pitch attitude changes in the aircraft as sensed by the attitude device 42, operate pick-off 41 to supply an A.C. attitude error signal to the demodulator amplifier 36.

Associated with pickoff 37 is a pitch synchronizer 44 having its rotational output supplied through suitable mechanical motion transmitting means 47 to a winding of pickup 37 to null the same. The pitch synchronizer is controlled from a synchronizer amplifier 45 which receives input control signals over conductor 46 extending from winding 38. The pitch synchronizer conventionally operates a velocity signal generator 48 which has its output supplied through resistor 49 to an input to the synchronizer amplifier 45 for damping purposes. Associated with the synchronizer amplifier 45 is a switch 50 having a two position actuating arm 51 which may engage an attitude hold contact at which time the amplifier 45 is connected to ground and thus is inoperative. Arm 51 may be engaged with another or idle contact at which time the synchronizer amplifier 45 is operative.

The following portion of a pressure section 50 is more intimately related with the programmed climb of an aircraft during which the switch arm 51 above is in the "other" or idle position. The pressure section signals utilized in the aircraft programmed climb control are a 350 knot equivalent air speed sginal, a function of $(h\text{M})$ signal, and a 550 knot equivalent air speed signal. Repeating, a mathematical expression for equivalent air speed is $V_e = KP_s^{1/2}M$, wherein $P_s$ is the static pressure and M equals the Mach number and K is a constant depending upon the units in which the static pressure is expressed. Thus where static pressure is expressed in inches of mercury the constant K will differ from that where it is expressed in pounds per square inch.

For providing the 350 knot equivalent air speed error signal, there is provided a computer 70 which through its mechanical output transmitted through an operating means 71 position a slider 73 of a potentiometer 72 having a resistor 74. Computer 70 receives one input in accordance with static pressure from sensor 78 and receives a second input in accordance with Mach from a Mach sensor 77. The constant K may be built into the computer 70 which in itself may be of the mechanical type utilizing either computing cams or levers.

Mechanical computing device responsive to air pressures are old in Miller et al, 3,023,616 and also in the computing art and no difficulty or problem is involved in providing the computation so that the outputs on shaft 71 is a product of $KP_s^{1/2}M$.

Potentiometer resistor 74 has a center tap terminal 75 and has its opposite ends connected to an A.C. energization source. Terminal 75 may be designated the 350 knot equivalent air speed point and when the slider 73 is moved to this position there is no signal output from potentiometer 72. For equivalent air speeds below 350 knots, slider 73 is to the right of the center tap 75 and may be assumed to provide A.C. signals of a negative phase whereas if slider 73 be to the left of terminal 75 the potentiometer 72 supplies signals of positive phase. The A.C. electrical signal from potentiometer 72 is transmitted by conductor 77 extending from slider 73 to a demodulator amplifier 80 having a feedback connection 79 which includes a lag network. The output from the demodulator amplifier 80 is transmitted by conductor 81 to a comparing arrangement 82 having its output supplied to an amplifier 85. Amplifier 85 in turn supplies its output over conductor 87 to a second comparing device 89.

A second signal is supplied to comparator 82. For this purpose, a computer 94 receives input altitude signals over transmitting means 95 and input Mach signals over transmitting means 96. Computer 94 supplies on the computer output 92 a mechanical displacement in accordance with a function $(h)\text{M}$. The mechanical displacement of operating means 92 is applied to a slider 98 of a potentiometer 99 having a resistor 100. Resister 100 is energized from a suitable A.C. supply and the instantaneous polarities of the resistor may be taken as indicated with the left end positive and the right end negative. Resistor 100 has a center tap 101. Center tap 101 may be considered the point on resistor 100 where in FIGURE 1 the function $(h)\text{M}$ reaches such magnitude that it intersects the 350 knot equivalent air speed surve 10 for a particular value of Mach.

The output from potentiometer 99 is transmitted by conductor 103 to a demodulator amplifier 104 having a feedback circuit 105 that includes a lag network. The output from demodulator amplifier 104 is transmitted over conductor 106 to comparator 82.

The comparator 82 is so arranged that it transmits to amplifier 85 the most negative or least positive of the two signals supplied to the comparator over conductors 81, 106. The comparator 82 may consist of a pair of asymmetrical conducting devices such as rectifiers 107, 108 connected in back-to-back relationship. The junction of the two rectifiers extends to amplifier 85.

The comparator 89 is provided with a second input in accordance with 550 knot equivalent air speed error. This signal is provided by an arrangement comprising a computer 110 that receives one input over transmitting means 111 in accordance with static pressure and a second input over transmitting means 112 in accordance with Mach. The output from computer 110 like that from computer 70 is in accordance with expression $KP_s^{1/2}M$. The mechanical output is supplied by transmitting means 114 to position a slider 115 of a potentiometer 116. Potentiometer 116 includes a resistor 117 connected to a suitable A.C. source and the instantaneous polarities for the varying A.C. voltage may be taken as indicated with the left end of resistor 117 positive and the right end negative. Resistor 117 includes a center tap 118 so arranged that with the aircraft equivalent air speed equal to 550 knots the slider 115 is adjacent the tap 118 when no signal is developed by potentiometer 116. The A.C. electrical signal output of potentiometer 116 is supplied over transmitting means 119 to a demodulator amplifier 120 having a lag circuit 121 in its feedback path. The output of demodulator 120 is supplied by conductor 123 to the comparator 89.

Comparator 89 may consist of a pair of asymmetrical conducting devices such as rectifiers. The two rectifiers may be connected in opposite manner from that shown in the arrangement for comparator 82. Thus the comparator 89 will transmit the least negative or most positive of the two inputs supplied thereto over conductors 87, 123. The intermediate point between the rectifiers is connected through a resistor 124, lag network 125, to summing conductor 32. It is noted that this circuit between resistor 124 and summing conductor 32 includes a single pole two position switch 127 having a "programmed and descent" control (presently disengaged in the drawing) and an "other" or idle contact.

*Operation*

Having reviewed the detailed description of the arrangement, the operation of the control apparatus for the aircraft may be considered. It is assumed that the aircraft flight begins well below curve 11 and well to the left of curve 10 in FIGURE 1. The pilot of the aircraft by manual control and with the engine throttle in position number one or non-after burning or lower thrust and switch 51 in the synchronizing position manipulates the elevator control surface until an indicator 28 shows him to be flying at 350 knots equivalent air speed. At this time clutch 21 may be engaged to connect the autopilot to the elevator 20. Switch arm 51, in the synchronizing position, may be moved to the attitude hold contact.

The automatic control system of FIGURE 2 through the attitude sensor 42 and the pressure section 50 will automatically operate the aircraft so that it follows the curve 10 to the intersecting point 13 and from there follows curve 11 to the intersecting point 14 and from there follows the curve 12.

The manner in which automatic control for the elevator surface is effective to cause the craft to maintain and follow the above flight profile may be demonstrated by taking a few hypothetical positions of the aircraft where it is off the flight profile after being initially placed thereon.

Referring to the three potentiometers 72, 99, and 116 for a given altitude, if the sliders be to the right of their center taps, the potentiometers will supply a negative signal whereas if the sliders be to the left of their respective center taps the respective potentiometers will develop a positive signal.

Considering a hypothetical position 15 FIGURE 1 of the aircraft off the flight profile and assuming in the first instance that the aircraft is at altitude of 30,000 feet at .85 Mach. This point, representative of the aircraft's position, is to the left of curve 10 and to the right of curve 11 extended leftward below the intersecting point 13 of curves 10, 11. It will be noted that with respect to the three potentiometers 72, 99, 116 that arrows related to the sliders indicate the direction of slider movements for increasing air speeds. For the above altitude, Mach coordinates, potentiometer 72 will develop a negative signal since this point is to the left of curve 10. Potentiometer 99 will develop a positive signal since the selected point is to the right of the curve 11. The negative signal will be transmitted through comparator 82 since it transmits the more negative signals and will be supplied through amplifier 85 to second comparator 89.

It will be readily appreciated that the potentiometer 116, for this same point which is well to the left of curve 12 extended below intersecting point 14, develops a negative signal. Since comparator 89 transmits the least negative signal in this case, the signal from potentiometer 72 is transmitted to summing conductor 32 of the control apparatus to control the elevator surface 20 in such a manner to increase the air speed of the craft for its Mach thereby causing the craft to follow the 350 knot equivalent air speed curve.

In a second instance assume that the aircraft position 16 is at Mach 1.0 at an altitude of 40,000 feet. The point is above curve 11 and below curve 10 extended above intersecting point 13 or to the left of curve 11 and to the right of curve 10 as extended. For the second hypothetical point 16, potentiometer 72 develops a plus or positive signal whereas potentiometer 99 develops a negative signal. The most negative of these signals is transmitted by comparator 82 and supplied to the second comparator 89.

For this same purpose, since point 16 is well to the left of curve 12 extended below intersecting point 14, potentiometer 116 will develop a negative signal. Since comparator 89 transmits the least negative signal of two negative signals in this instance, the signal from potentiometer 99 will be transmitted by comparator 89 and will be supplied to summing conductor 32 and the control apparatus to control the elevator surface 20. The elevator surface is so controlled as to increase the air speed causing the aircraft to follow curve 11.

In relating the above signals from the potentiometers 72, 99 and 116 with respect to the flight profile, it is to be understood that the distance of a particular point from any of the curves 10, 11, and 12 is a measure of or determines the magnitude of the output signal from these potentiometers.

Assume as the third point 17 that the aircraft position on its flight profile is Mach 1.45 and at altitude of 60,000 feet. This point 17 is slightly to the right of 550 knot air speed curve 12 and somewhat below it and well to the right of curve 10 extended above intersection point 13 and well above curve 11 if it be imagined to be extended rightward from intersection point 14. The signal from potentiometer 72 since the hypothetical aircraft position is to the right of curve 10 extended will be positive whereas the signal from potentiometer 99 with the aircraft position above the curve 11 will be negative. The comparator 82 will transmit the more negative signal from potentiometer 99 to the second comparator 89. In the second comparator, the signal from potentiometer 116 is positive, and thus the signal from potentiometer 116 will be transmitted through comparator 89. This signal from potentiometer 116 through the apparatus serves to control the elevator surface so as to decrease the Mach or increase altitude so that the craft follows the 550 knot equivalent air speed curve.

While the operation has been described with respect to a programmed climb-out for the aircraft, it is apparent that automatic control may also be provided for a programmed descent along the above profile of FIGURE 1.

While only one embodiment of the invention has been illustrated and described, it will now be evident that various changes in the form and relative arrangement may be made to suit requirements without departing from the spirit of the invention.

What is claimed is:

1. An apparatus for following a desired flight profile for an aircraft which may be delineated by two curves which cross at an acute angle, comprising: means for developing at an altitude a first air speed error signal corresponding to the difference between the craft actual air speed and a lower equivalent airspeed delineated by one curve; means for developing a second air speed error signal corresponding to the difference between the actual air speed of the craft at the altitude and a joint function of both Mach and altitude delineated by the second curve; and means for comparing said two air speed error signals and selecting the one calling for greater increase in airspeed whereby to follow one of said two curves.

2. The apparatus of claim 1, and means developing a third signal in accordance with the difference between the actual air speed of the craft and a higher equivalent air speed of the craft which may be delineated by a third curve that crosses the second curve; means for comparing said selected signal and said third signal and transmitting the one of the last two signals calling for the smaller increase in airspeed for following one of said three curves.

3. The apparatus of claim 2, means for developing a fourth signal in accordance with deviation of the aircraft from a selected attitude; and means summing said fourth signal and transmitted signal, whereby when the aircraft is controlled in accordance with said sum a desired flight profile is followed over three different air speeds.

4. In apparatus whereby an aircraft may be caused to follow a desired flight profile during climb-out which involves changes in altitude and Mach; means providing a first control effect in accordance with difference of the craft equivalent air speed and a first selected equivalent air speed; means for developing a second control effect in accordance with the difference of the craft actual air speed and a function of craft altitude and Mach; means for comparing the first and second control effects and transmitting the control effect calling for the lesser increase in pitch attitude or greater decrease in pitch attitude of the craft; and means responsive to said transmitted control effect for controlling attitude changing means on the craft whereby the aircraft initially maintains as its flight profile the selected indicated air speed at low altitude and thereafter maintains the function of altitude and Mach.

5. In means for indicating the position of an aircraft with respect to an optimum path which may be delineated by two curves crossing at an acute angle: means for providing for an altitude of the craft a first control effect corresponding to the difference between craft air speed and a desired air speed delineated by one curve; means for providing a second control effect at said altitude with the deviations in actual craft air speed from a function of both altitude and Mach delineating a second curve; and means responsive to said first and second control effect and developing a resultant output corresponding in sense and magnitude to the extent and direction of deviation of the craft from the optimum path formed by a portion of each curve.

6. In an aircraft control apparatus for navigating said craft: means providing at an altitude of the craft, a first control effect in accordance with departure of a craft flight condition of the craft from a first selected flight condition involving altitude and airspeed; means concurrently providing, at said altitude, a second control effect in accordance with departure of the craft flight condition of the craft from a second selected flight condition which is a joint function of airspeed and altitude of the craft; additional means responsive to said two effects to develop an output in accordance with that control effect or departure of the craft from the one of said two selected flight conditions calling for the lesser increase in craft pitch-up attitude or greater increase in the craft air speed thereby defining a flight profile of the craft; and further means controlled by the additional means in accordance with the output.

7. The apparatus of claim 6, wherein said control effects are electrical signals and said additional means comprises comparison means for transmitting but one of said two control signals.

8. In aircraft control apparatus for navigating said craft: means for receiving a first control effect in accordance with departure of a flight condition of the craft from a first selected flight condition which may be delineated by a graph or curve; means receiving a second control effect in accordance with departure of the flight condition of the craft from a second selected flight condition which is a joint function of the first selected flight condition and a third flight condition of the craft which may be delineated by a curve in the same plane as the first curve and that intersects said first curve; additional means responsive to said two effects to develop an output in accordance with departure of the craft from the one of said two selected flight conditions, the curves of which jointly define a flight profile of the craft, calling for a greater increase in craft-up attitude or lesser increase in said third flight condition; and further means controlled by the additional means in accordance with the output.

9. The apparatus of claim 8 wherein said further means positions attitude changing means for the craft.

10. In control apparatus for an aircraft for providing a programmed climb-out air speed for the craft: means for setting the attitude of the craft to jointly effect with the power of the craft a first equivalent air speed for the craft; means for providing a first control effect in accordance with departure of the craft air speed from the first equivalent air speed, which may be delineated by a graph or curve; means providing a second control effect in accordance with departure of the craft air speed from a second flight condition which is a joint function of the air speed and altitude of the craft, which may be delineated by a second curve that intersects the first curve; additional means responsive to said two effects to develop an output in accordance with departure of the craft air speed from the first curve below air speed of Mach one and an output in accordance with departure of the craft air speed from the second curve in regions of Mach values above Mach one.

11. An apparatus for following a desired flight profile for an aircraft which may be delineated by two curves which cross at an acute angle, comprising: means for developing at the craft altitude a first air speed error signal corresponding to the difference between the craft actual air speed and an air speed delineated by one curve; means for developing a second air speed error signal corresponding to the difference between the craft actual air speed and a joint function of both Mach and altitude delineated by the second curve; and means for comparing said two air speed error signals and selecting the one to follow the first curve above the point of intersection and the second curve below the point of intersection of the two curves.

12. In control apparatus for an aircraft, a first signal generator developing a zero signal when the craft is operated in accordance with a first function of a first and a second flight condition which defines a two dimensional graph with two axes; a second signal generator developing a zero signal when the craft is operated in accordance with a second function of the first and second flight conditions which defines a second two dimensional graph in the same plane as the first graph and that crosses the first graph to form therewith a pair of acute angles; comparing means receiving error signals from the two signal generators when the craft is not operating in accordance with either function and has a position in accordance with the two flight conditions and within one acute angle, said comparing means transmitting only the error signal calling for a change in the one flight condition resulting in least change in craft pitch up attitude and thus displacement in the position of the craft graphically in the direction along the axis of this one flight condition to attain one of said graphs.

References Cited

UNITED STATES PATENTS 3,241,792   3/1966   Hattendorf _____ 244—77

FERGUS S. MIDDLETON, *Primary Examiner.*